(No Model.)
J. W. GARDNER.
CAR COUPLING.
No. 474,553. Patented May 10, 1892.
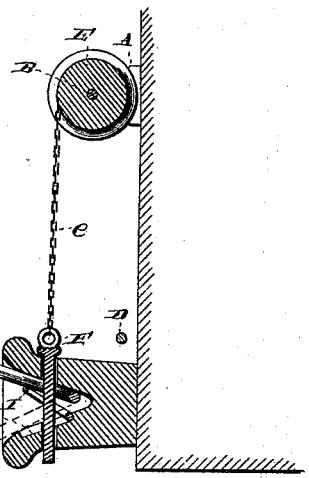
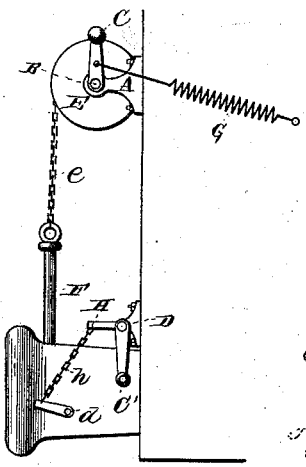
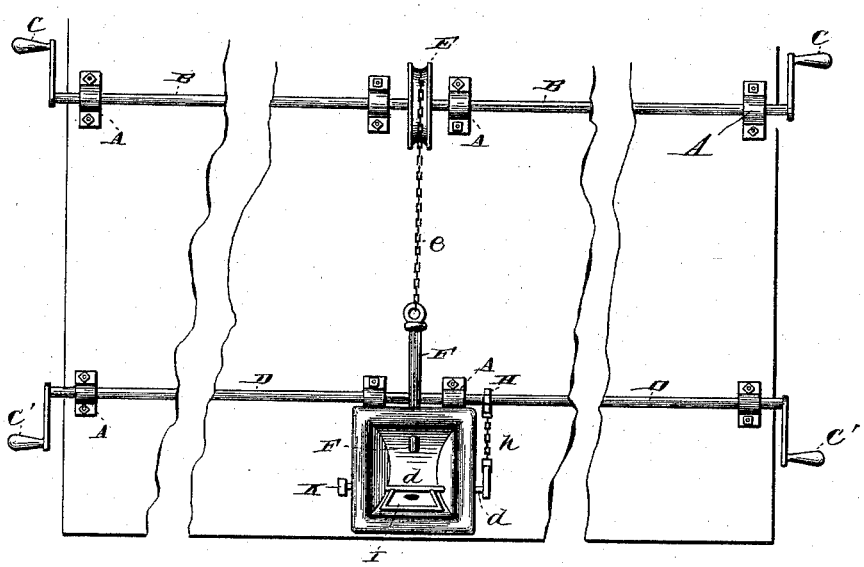
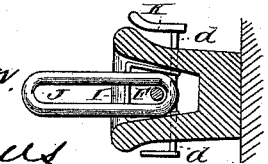
Witnesses:
Inventor:
John W. Gardner

UNITED STATES PATENT OFFICE.

JOHN W. GARDNER, OF ATKINS, MICHIGAN.

CAR-COUPLING.

SPECIFICATION forming part of Letters Patent No. 474,553, dated May 10, 1892.

Application filed April 9, 1891. Serial No. 388,338. (No model.)

*To all whom it may concern:*

Be it known that I, JOHN W. GARDNER, a citizen of the United States, residing at Atkins, in the county of St. Clair and State of Michigan, have invented a new and useful Car-Coupling Device, of which the following is a specification.

My invention relates to improvements in car-couplings which use link, pin, and draw-head; and the object of my improvement is to afford means and facilities for coupling cars without the necessity of the operator placing himself between the approaching cars. I attain this object by the mechanism illustrated in the accompanying drawings, in which—

Figure 1 is a vertical longitudinal section of the machine. Fig. 2 is a side view of the machine without the link. Fig. 3 is a front or end view of the same, and Fig. 4 is a horizontal section of draw-head.

Similar letters refer to similar parts throughout the several views.

The hangers A secure the machine to the car. In the hangers work shafts B and D, operated by cranks C C. On B is fitted pulley E, with chain $e$ attached to pin F. Spiral spring G holds shaft B from turning, and thus raising or lowering pin F, excepting when power is applied by the operator at crank C. D has an arm H, which, by chain $h$ and shaft $d$ and the looped arm I within the draw-head, will raise link J to height necessary to enter draw-heads of other cars, as shown by Fig. 1. The shaft $d$ is brought back to normal position by the counter-weight K, attached to end of shaft, as in Fig. 4.

What I claim, and desire to secure by Letters Patent, is—

1. The combination, in a car-coupling device, of a link, pin, and draw-head, with shaft B, pulley E, chain $e$, spring G, and cranks C for manipulation on pin F, all substantially as set forth.

2. The combination, in a car-coupling device, of a link, pin, and draw-head, with shaft D, cranks C, arm H, chain $h$, and shaft $d$, looped arm I, and counter-weight K for manipulating link J, all substantially as set forth.

3. The combination, in a car-coupling device, of a link, pin, and draw-head, with groove L, in which lies looped arm I when in its normal position, shaft D, crank C, arm H, chain $h$, and shaft $d$, looped arm I, and counter-weight K for manipulating link J, all substantially as set forth.

JOHN W. GARDNER.

Witnesses:
E. A. MCINTYRE,
JOHN D. GARDNER.